United States Patent [19]

Mitsuoka

[11] Patent Number: 4,685,278
[45] Date of Patent: Aug. 11, 1987

[54] HORSE LEG GUARDS

[76] Inventor: Hideo Mitsuoka, 1-31, Nishiki-machi, Okayama-shi, Okayama-ken, Japan

[21] Appl. No.: 770,279

[22] Filed: Aug. 28, 1985

[30] Foreign Application Priority Data

Aug. 28, 1984 [JP] Japan ................. 59-129245

[51] Int. Cl.⁴ ............................................. B68B 7/00
[52] U.S. Cl. ................................... 54/82; 128/80 R; 128/165
[58] Field of Search ............... 54/71, 80, 82; 119/126, 119/143; 128/77, 80 R, 80 H, 82, 165

[56] References Cited

U.S. PATENT DOCUMENTS

| 290,096 | 12/1883 | O'Brien | 54/82 |
| 581,042 | 4/1897 | Sites | 54/82 |
| 2,246,100 | 6/1941 | Marzani | 54/82 |
| 3,605,122 | 9/1971 | Myers | 128/165 X |
| 3,913,302 | 10/1975 | Centers | 54/82 X |
| 4,342,185 | 8/1982 | Pellew | 54/82 |
| 4,476,857 | 10/1984 | Levine | 128/77 |
| 4,548,026 | 10/1985 | Shidner | 54/82 |

Primary Examiner—Robert P. Swiatek
Attorney, Agent, or Firm—Wenderoth, Lind & Ponack

[57] ABSTRACT

A horse leg guard for protecting the horse leg, particularly articulated portions, from accidental injuries having a resilient belt-like cloth provided with an articulation abutting portion which abuts against the horses legs articulated portion when the cloth is wrapped around the horse leg and engaging members for clamping and securing the belt-like cloth after the belt-like cloth is applied to the horse leg. A sealing member is attached to the upper end portion of the belt-like cloth for sealing the gap between the belt-like cloth and the horse leg to prevent sand or fine stones from entering into the belt-like cloth through the gap for preventing injury to the horse leg.

7 Claims, 15 Drawing Figures

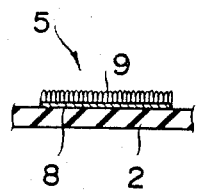
FIG. 3
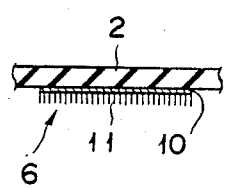
FIG. 4
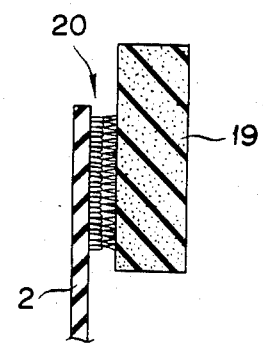
FIG. 7
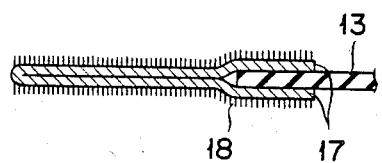
FIG. 5
FIG. 6
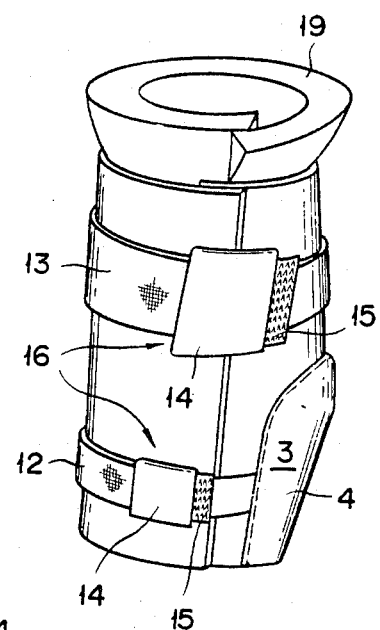
FIG. 10
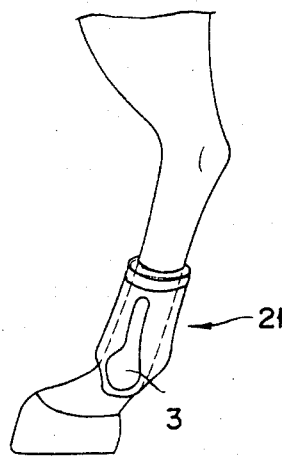
FIG. 12
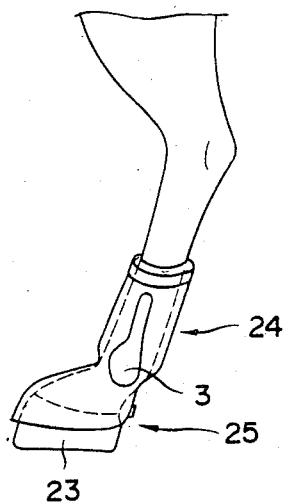

HORSE LEG GUARDS

BACKGROUNDS OF THE INVENTION

This invention relates to improved leg guards or protectors for guarding the articulated like portions of horse legs or the like.

Generally, it is well known to use leg guards or protectors for a horse, particularly a race horse, to prevent the articulated or like portions of the horse's legs from being injured by accidental direct contact to the ground or direct friction with the other leg portions.

However, despite the introduction of leg guards or protectors of the known type described above, there have not been leg guards for completely and safely protecting the articulated or like leg portions of the horse. There is a fear that sands or fine stones may enter accidentally into the leg guard through a small gap between the horse leg portion and the leg guard during a race. The invasion of such sands or stones may not only injure the leg portion of the horse but may also slow down the running speed of the race horse during a horse race.

SUMMARY OF THE INVENTION

An object of this invention is to eliminate defects or disadvantages found in the prior art and to provide an improved horse leg guard capable of preventing sands or the like from entering into the leg guard through a gap between the horse leg and the leg guard to protect the horse leg from being injured.

Another object of this invention is to provide a horse leg guard made of a soft and flexible material easily attachable to the horse leg without creating a physical constraint.

According to this invention for achieving these and other objects, there is provided a horse leg guard of the type comprising a belt-like cloth made of a resilient material provided with a portion for covering and abutting against a horse's leg's articulated portion and an outer skin secured to a front surface of an articulation abutting portion, and an engaging means for clamping and securing the belt-like cloth from the outside thereof when the belt-like cloth is wrapped around a horse leg so that the articulation abutting portion abuts against the horse's leg's articulated portion, wherein a sealing member is attached to an upper portion of the belt-like cloth for sealing a gap between the belt-like cloth and the horse's leg.

BRIEF DESCRIPTION OF THE DRAWINGS

In the accompanying drawings:

FIG. 3 shows a cross sectional view of engaging means for the horse leg guard taken along the line III—III shown in FIG. 1;

FIG. 4 shows a cross sectional view of engaging means for the horse leg guard taken along the line IV—IV shown in FIG. 1;

FIG. 5 also shows a cross sectional view of engaging means for the horse leg guard taken along the line V—V shown in FIG. 1;

FIG. 6 is a perspective view showing the horse leg guard shown in FIG. 1 applied to the horse leg;

FIG. 7 shows a cross sectional view of a sealing member attached to the horse leg guard taken along the line VII—VII shown in FIG. 2;

FIG. 10 is a side view showing the horse leg guard of FIG. 8 applied to the horse leg;

FIG. 12 is a side view showing the horse leg guard shown in FIG. 11 applied to the horse leg;

DESCRIPTION OF THE PREFERRED EMBODIMENTS

Figure 1:
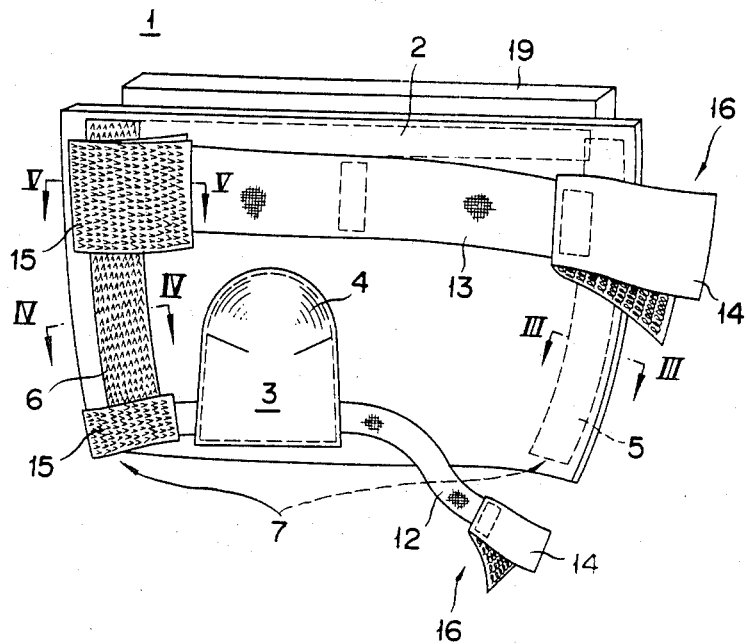
FIG. 1 is a perspective view showing the front of one embodiment of a horse leg guard according to this invention.
Figure 2:
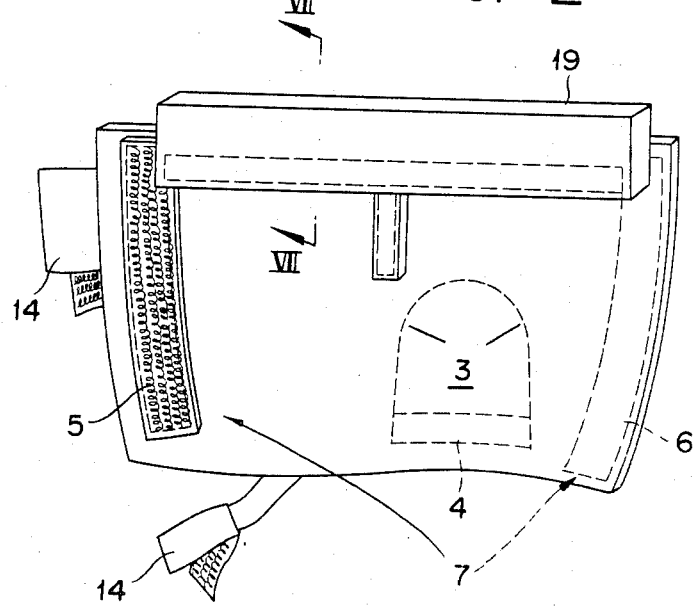
FIG. 2 is a perspective view showing the back of the embodiment shown in FIG. 1.

Referring to FIG. 17 which illustrates one embodiment of a horse leg guard 1 or protector according to this invention, an articulation abutting portion 3 having a bowl shaped configuration for covering an articulated or the like portion of the horse leg is formed to a resilient belt-like cloth 2 made of a sheet shaped sponge on which a cloth is attached and having a length suitable for covering the periphery of the necessary portion of the horse leg. An outer cover 4 made of an animal skin or a rubber is sewn on the surface of the articulation abutting portion 3. The outer cover 4 is formed in a bowl shape so as to cover the bowl portion of the belt-like cloth 2 and to protect the horse leg's articulated abutting portion to prevent one leg portion of the running horse from adversely contacting the other leg portion when the leg guard shown in FIG. 1 is applied.

A material 5 of a velcro type fastener is sewed at one end of the rear surface of the belt-like cloth 2. An engaging material 6 of the velcro type fastener is secured at the other end of the front surface of the cloth 2, so that the material 5 and 6 are engaged to comprise a first engaging means 7 when the belt-like cloth 2 is wrapped around the horse leg.

As shown in FIG. 3, the material 5 is formed by fixing a plurality of flexible looped fibers 9 on a face cloth 8 and as shown in FIG. 4. The material 6 is formed by fixing a plurality of needle-like projections 11 on a face cloth 10.

Resilient materials 12 and 13, for example a rubber covered by non-water-absorptive cloths, are sewn on the belt-like cloth 2 as shown in FIG. 1. Second engaging means 16, 16 consisting of materials 14, 14 to be engaged and materials 15, 15, similar to the first engaging means 7, are provided at both ends of the resilient materials 12 and 13, respectively. The second engaging means 16 is fixed to the horse leg by clamping the belt-like cloth 2 after wrapping the cloth 2 around the horse leg. The engaging material 15 is formed by fixing a plurality of needle-like projections 18 on the surface of a base cloth 17 as shown in FIG. 5 and the material 14 is formed by fixing a plurality of flexible looped fibers on a base cloth having a bifurcated configuration so as to be engaged with both surfaces of the engaging material 15.

When it is required to wrap the belt-like cloth 2 around the horse leg so as to cover the articulated portion of the horse leg with the articulation abutting portion 3, it can be easily done by wrapping the belt-like cloth 2 around the horse leg from the side portion of the horse by a worker without wrapping the same from a portion under the horse body so the the engaging means 7 and 16 will be positioned on the outer side of the horse leg.

Specifically, according to the preferred embodiment of this invention, a sealing material or member 19 is attached to the inside surface of the upper end portion of the belt-like cloth 2 so as to seal a gap formed between the horse leg and the belt-like cloth 2 thereby to prevent sands or the like from entering into a space therebetween through the gap. This sealing material 19 may be of a material made of formed urethane rubber, for example, for providing a cushion between the leg guard and the horse leg. The sealing material 19 is detachably attached, as shown in FIG. 7, to the belt-like cloth 2 by fixing means 20 comprising a velcro type fastener.

The leg guard 1 thus composed is wrapped around the horse leg so that the articulation abutting portion 3 of the leg guard covers the horse's leg's articulated portion. Since the leg guard 1 is relatively wide, the leg guard can not only cover the entire horse's leg's articulated portion but also protects leg portions near the articulated.

After the leg guard 1 has been wrapped around the horse leg, the engaging means 7 is engaged so as to clamp the horse leg guard by utilizing the resiliency of the belt-like cloth 2 to prevent a shift thereof. The engaging means 16 is then engaged above the wound up cloth 2 thereby to completely attach the leg guard 1 around the horse leg.

In the attached state of the leg guard to the horse leg, the sealing member 19 completely seals the gap between the horse leg and the leg guard 1 at the upper portion of the wound belt-like cloth 2, and moreover, since the sealing member 19 is positioned, in the state, at a projected position above the upper end of the belt-like cloth 2, there is no fear of sands or the like accidentally invading the leg even when the horse runs thereby preventing the horse leg from injury. In addition, since the belt-like cloth 2 is made of a soft and flexible material, it is suitably fitted to the horse leg without a feeling of physical constraint when the cloth 2 is wrapped around the horse leg.

Figure 8:
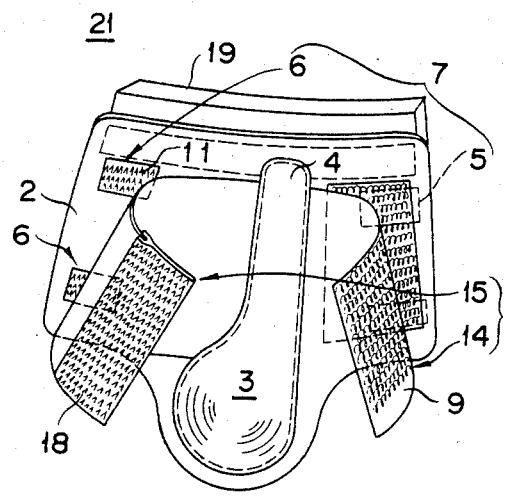
FIG. 8 is a perspective view showing the front of another embodiment of a horse leg guard according to this invention.
Figure 9:
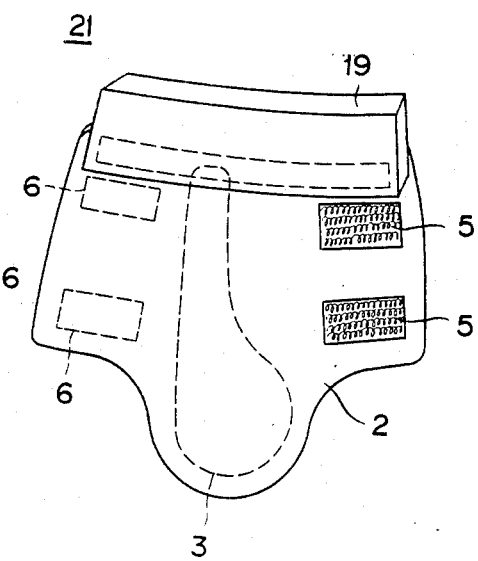
FIG. 9 is a perspective view showing the back of the embodiment shown in FIG. 8.

FIGS. 8 and 9 show another embodiment of the horse leg guard according to this invention, in which like reference numerals are added to elements or materials corresponding to those shown in FIGS. 1 through 7.

In this embodiment, the belt-like cloth 2 of a horse leg guard 21 is provided with the articulation abutting portion 3 at a lower portion of the substantially central portion of the belt-like cloth 2. The second engaging means 16 is formed by one wide resilient portion of material. The leg guard 21 of this type is most suitable for the protection of the inside skin surface of the articulated portion of a rear leg of a horse as shown in FIG. 10.

Figure 11:
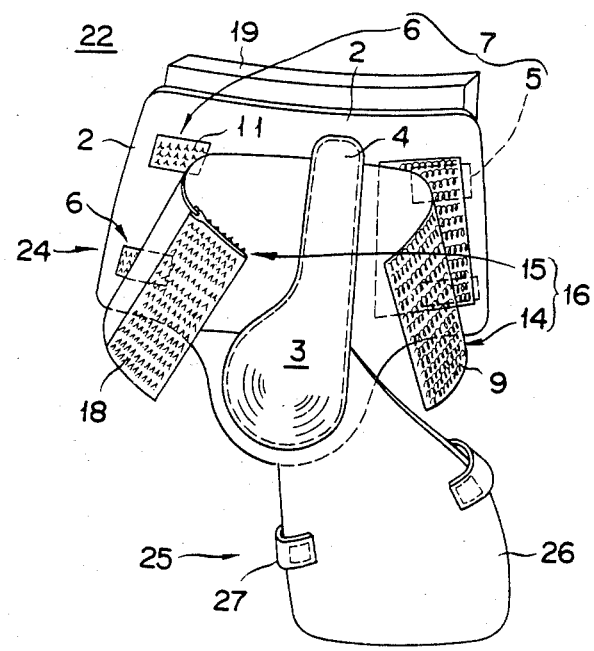
FIG. 11 is a perspective view showing the front of a further embodiment of a horse leg guard according to this invention.

FIG. 11 shows a further embodiment of a horse leg guard 22 according to this invention which aims to protect a hoof 23 of a horse as well as the horse leg.

The horse leg guard 22 of this embodiment comprises an articulation covering portion 24 of the type described before with respect to the former embodiment and a horse hoof covering portion 25. The articulation covering portion 24 has substantially the same construction as that shown in FIG. 8, but the hoof covering portion 25 has one end sewen to the belt-like cloth 2 together with the articulation abutting portion 3 and the other end provided with a hoof protecting portion 26 suspended for covering the horse hoof 23 and a belt 27 for clamping the hoof protecting portion 26.

According to the construction of the leg guard shown in FIG. 11, the portion 25 covering the horse hoof 23 also covers the upper portion of the hoof 23, so that even if the horse accidentally kicks the hoof of his rear leg with his front leg during a horse race, for example, the rear leg is not damaged or injured.

Figure 13:
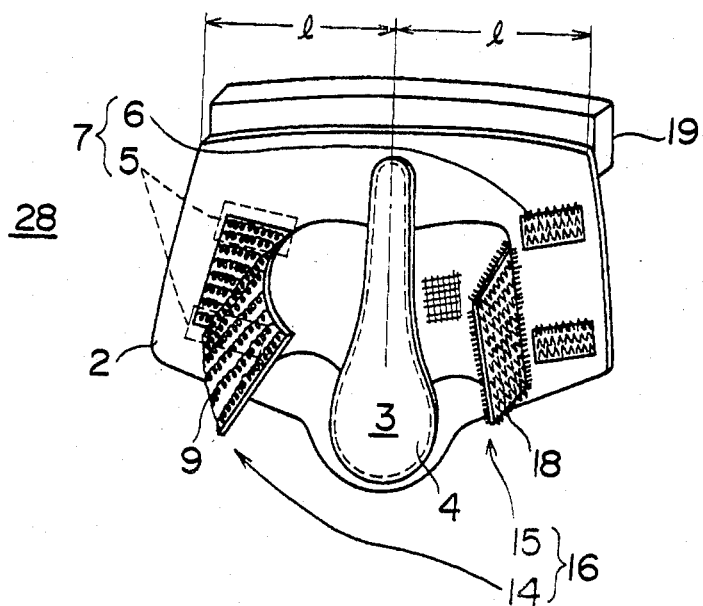
FIGS. 13 and 14 are perspective views showing the front of further embodiments of horse leg guards according to this invention.
Figure 14:
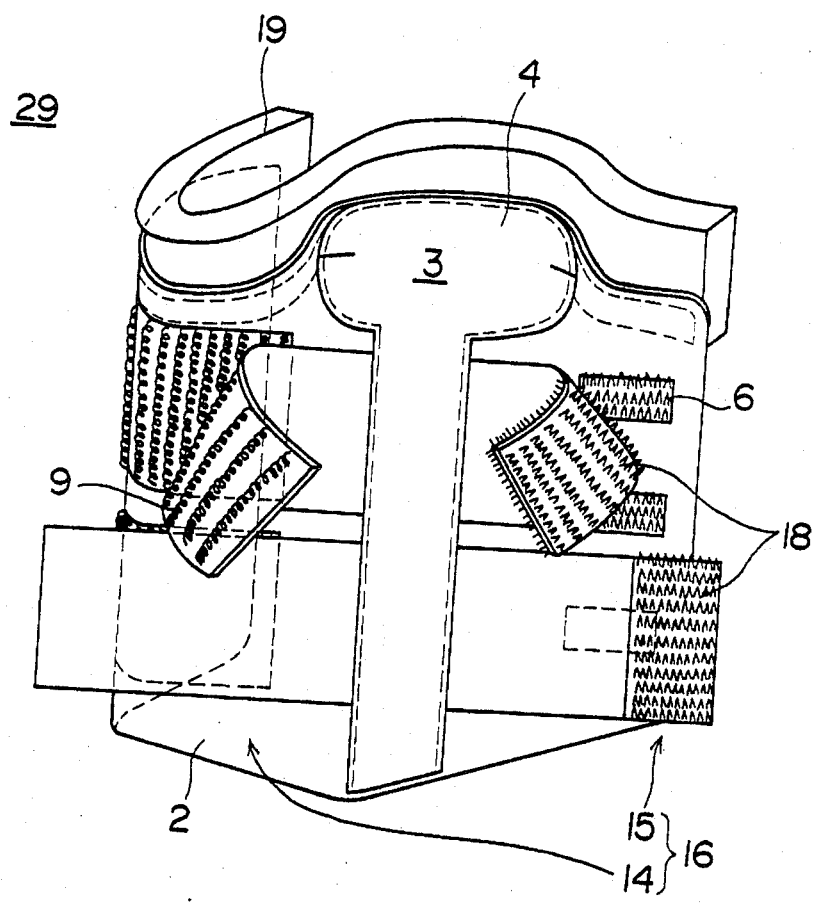

FIGS. 13 and 14 show still another embodiments of the horse leg guard according to this invention, in which like reference numerals are added to members or portions corresponding to those shown in FIG. 1 though FIG. 7.

Figure 15:
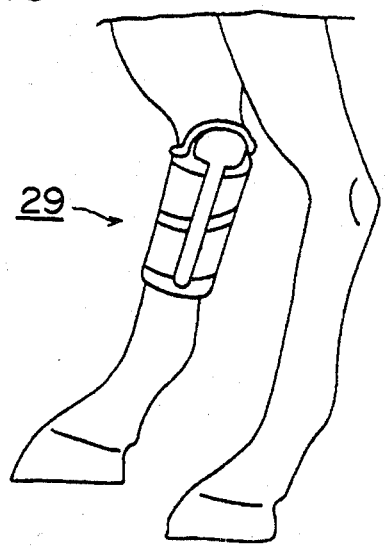
FIG. 15 is a side view showing the horse leg guard shown in FIG. 14 applied to the horse leg.

The horse leg guard 28 of the embodiment shown in FIG. 13 is provided with the articulation abutting portion 3 at substantially the central portion of the belt-like cloth 2 and the center line of the outer cover 4 lies at a position spaced from the end of the belt-like cloth 2 by a distance 1. The outer cover 4 in this embodiment has a guard shape which is relatively easily manufactured with low cost. FIG. 15 shows the leg guard 29 shown in FIG. 14 wrapped around the horse leg to particularly protect the inner surface of the second articulated portion of the horse leg rather than the ankle portion thereof. In the actual attachment of the horse leg guard 29, the articulation abutting portion 3 abuts against the second articulated portion of the horse leg and the leg guard 29 is secured there by using the engaging means of the type described hereinbefore. Thus, the leg guard 29 can not only protects the second articulated portion of the horse leg but also prevents sands or the like from entering into the gap between guard 28 and the horse's leg.

As described above, according to this invention, since a sealing member is attached to the upper end of a resilient belt-like cloth which is wrapped around a horse leg so that an articulation abutting portion having a specific configuration flexibly protects the horse's leg's articulated portion, invasion of sands, fine stones or the like into the horse leg guard through a gap between the horse leg and the belt-like cloth can be prevented thereby protecting the horse leg from injury. In addition, materials constituting the horse leg guard of this invention are suitably selected so that the horse leg, particularly the articulated portions thereof are softly covered without creating a feeling of physical constraint. Moreover, the horse leg guard is provided with a specific engaging means, so that it can easily be attached to the horse leg.

What is claimed is

1. A horse leg guard comprising:
   a resilient cloth having first and second ends and upper and lower edge portions for wrapping the articulated portion of a horse leg;
   an articulation abutting portion secured to said resilient cloth between said first and second ends having an outer skin for contacting and protecting said articulated portion when said resilient cloth is wrapped around the horse leg;

an engaging means for detachably attaching said first and second ends of said resilient cloth together for securing said horse leg guard to the horse leg and for maintaining the articulation abutting portion on said articulated portion when said resilient cloth is wrapped around the horse leg;

a sealing member detachably attached to said upper edge portion of said resilient cloth for sealing a gap formed between said resilient cloth and the horse leg when said resilient cloth is wrapped around the horse leg; and means secured to said upper edge for detachably attaching said sealing member to said resilient cloth.

2. The horse leg guard claimed in claim 1 wherein, said sealing member is a formed urethane rubber.

3. The horse leg guard claimed in claim 1 wherein, said articulation abutting portion has a bowl-shaped outer configuration for covering the articulated portion when said resilient cloth is wrapped around the horse leg.

4. A horse leg as claimed in claim 1 wherein, said leg guard further comprises a cover portion for covering a hoof of the horse leg when said resilient cloth is wrapped around the horse leg.

5. The horse leg guard claimed in claim 4, wherein, said engaging strap means is a strip of non-water-absorbing resilient material.

6. The horse leg guard of claim 4 wherein, said engaging member is a first base material and a plurality of barbed projections affixed to said first base material;

and said engaged member is a second base material and a plurality of looped fibers secured to said second base material, said barbed projections cooperating with said looped fibers for securing said engaging member to said engaged member after said resilient cloth is wrapped around the horse leg.

7. The horse leg guard claimed in claim 1 wherein, said engaging means comprises at least one engaging strap means secured to the surface of said resilient cloth and having first and second free ends, an engaged member secured to one of said free ends of said engaging strap means, and an engaging member secured to the other of said free ends of said engaging strap means for engaging said engaged member to secure said horse leg guard to the horse leg when said resilient cloth is wrapped around the horse leg.

* * * * *